A. LORING.
Tree-Protector.

No. 220,481.  Patented Oct. 14, 1879.

WITNESSES
Frank C. Parker
Nath. R. Evans

INVENTOR
Abbott Loring
pr William Edson Atty

UNITED STATES PATENT OFFICE.

ABBOTT LORING, OF BOSTON, MASSACHUSETTS.

IMPROVEMENT IN TREE-PROTECTORS.

Specification forming part of Letters Patent No. 220,481, dated October 14, 1879; application filed September 23, 1876.

*To all whom it may concern:*

Be it known that I, ABBOTT LORING, of Boston, in the county of Suffolk and State of Massachusetts, have invented a new and useful Improvement in Tree-Protectors, of which the following is a specification.

This invention relates to improvements upon the tree-protectors described in the specification accompanying Letters Patent of the United States issued to William J. Towne, dated September 13, 1860, No. 44,238, and consists substantially as hereinafter fully described.

Figure 1:
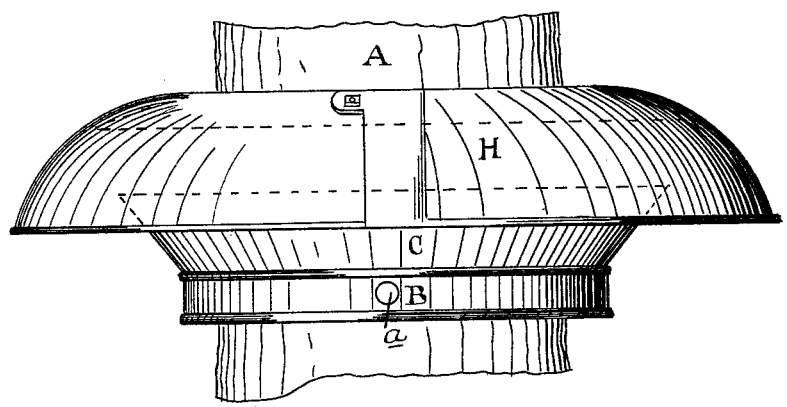
Figure 2:
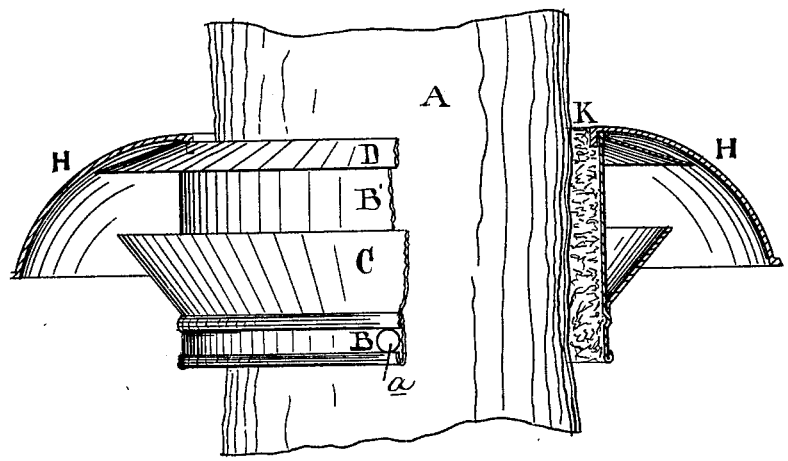

In the accompanying drawings this invention is illustrated, Figure 1 being a view, in elevation, of this improved tree-protector as applied to a tree; Fig. 2, a section of the same in part.

In the drawings, A represents a tree; C, an annular trough made of sheet metal and in two sections, joined together at their ends, surrounding the tree A, and of a diameter somewhat larger than the tree, leaving an annular space around and between the tree and said trough, in which space is packed oakum, &c., the trough being attached to the tree by wires or nails extending from it to the tree, through or below the packing. This trough, in the present instance, is formed of a tube or cylinder, B, having soldered at a short distance above its lower edge the flaring portion C, forming the outside of the trough.

To the upper end of the tube or cylinder B is applied an annular cover or guard, H, its outer edge extending outward and downward beyond the outer edge of trough C, as shown in the drawings. This guard protects the oil in the trough from the rays of the sun, which would dry it up or evaporate it, and it also prevents rain from drifting into the trough. Said guard is removable in order to afford ready access to the trough for cleaning it out or filling it up. This cover or guard H is made of cast-iron and in two sections, united at their ends by bolts and nuts or by lap-joints, and is held in position by the flange K.

When all are secured and applied to the tree the trough C is filled with oil.

So far the arrangement and construction of the several parts are substantially as described and shown in the specification attached to said Letters Patent.

Although this tree-protector, as described and shown in said Letters Patent, is successful generally in preventing canker-worms and other insects ascending the tree, it has not completely prevented such, for, in the event of a rain-storm, the water running from the top of the tree down the trunk would fill up the space over the packing, and when this was full it would run over the top inner edge of the trough C (this edge being lower than the top surface of the cover) down into the trough and displace the oil. The worms, therefore, would cross the water-surface and thus finally ascend the tree, and thus rain-storms would necessitate the watching of the trough more or less by the gardener, &c., to remove the water, &c.

To obviate this trouble is the object of the present invention, which consists in attaching to the upper edge of the tube or cylinder B a supplementary flange, D, serving as an extra guard to the trough, this guard or flange being made in one or more sections and of sheet metal, the same as the trough, and attached by solder to the inner upper edge of the tube B.

The guard or cover H being easily removable, a water-tight joint between it and the tube is impracticable, and were the supplementary guard D omitted, the water would leak over the top of said tube, and flow down into the trough C. As this supplementary guard is only intended to protect the trough from the overflow mentioned, it is not extended downward to the trough, but a sufficient space is left between its outer edge and the outer edge of the trough to permit very ready access to the trough for the purpose of filling or cleaning. As before stated, the inner edge of the guard D is soldered to tube B, so that leakage into the trough is impossible.

The supplementary flange or guard D extends at a right angle, or thereabout, from the inner edge of the tube B, and projects slightly over and beyond the outer edge of the trough C, but not so far as the cover H. This supplementary guard D entirely prevents the water from entering the trough, for when water does collect in the space, as described, it flows over the outer edge of this flange or guard.

As this outer edge extends beyond the outer edge of trough B, the water will drop to the ground, as is obvious.

The cylinder B extends, as shown in the drawings, below the trough, and is provided with holes $a$, through which nails, &c., are passed and driven into the tree, to secure the protector to the tree, making a ready and effectual means of securing the tree-protector in position.

Although the trough and its supplementary guard are described as made of sheet metal and soldered together at their points of intersection, they can be made of cast-iron and attached to each other in any manner desirable, although sheet metal is preferable, as the several parts are much easier joined and at less expense; but it is preferable to make the cover of cast-iron, for the purpose of resisting blows from the fall of broken limbs, &c., and the guard and the cylinder, or the trough and cylinder, can be made of one piece of metal by casting in one or more sections.

What I claim is—

In a tree-protector, the combination of a tube, B, trough C, encircling said tube, the removable guard or cover, having its inner edge resting upon the top of said tube and its outer edge extending outward and downward beyond the top of the trough, and the supplementary guard D, arranged entirely above the trough, and having its inner edge connected to tube B by a water-tight joint, substantially as and for the purpose set forth.

ABBOTT LORING.

Witnesses:
FRANK G. PARKER,
WILLIAM EDSON.